(12) United States Patent
Dhanoa et al.

(10) Patent No.: US 8,558,866 B1
(45) Date of Patent: *Oct. 15, 2013

(54) ENSURING QUALITY OF A VIDEO STREAM THROUGH A TELECOMMUNICATIONS NETWORK

(75) Inventors: Shingara Singh Dhanoa, Overland Park, KS (US); Bejoy Pankajakshan, Olathe, KS (US); Randolph Keith Hiser, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,171

(22) Filed: Mar. 9, 2012

Related U.S. Application Data

(63) Continuation of application No. 12/171,451, filed on Jul. 11, 2008, now Pat. No. 8,159,520.

(51) Int. Cl.
*H04N 7/14* (2006.01)
*H04N 7/173* (2011.01)

(52) U.S. Cl.
USPC ..................................... 348/14.02; 725/105

(58) Field of Classification Search
USPC .......... 348/14.01, 14.02, 14.08, 14.12–14.15; 370/259, 260; 709/204; 725/105, 106
See application file for complete search history.

(56) References Cited

U.S. PATENT DOCUMENTS

| | | | |
|---|---|---|---|
| 2003/0043777 A1* | 3/2003 | Koponen et al. | 370/349 |
| 2008/0025261 A1* | 1/2008 | Riley | 370/331 |
| 2008/0037864 A1* | 2/2008 | Zhang et al. | 382/156 |
| 2008/0281971 A1* | 11/2008 | Leppanen et al. | 709/228 |

* cited by examiner

*Primary Examiner* — Tuan D Nguyen

(57) ABSTRACT

A method and medium are provided for ensuring that a video stream communicated from a mobile device is communicated subject to a minimum quality level. A request to communicate a video stream at a minimum quality level from a mobile device is received. Signaling information from the mobile device is processed and utilized to establish a communications pathway from the mobile device to the target device. The communications pathway facilitates the communication of the video stream at the minimum quality level. The video stream is communicated to the target device contemporaneously to receiving the video clip by the mobile device.

17 Claims, 6 Drawing Sheets

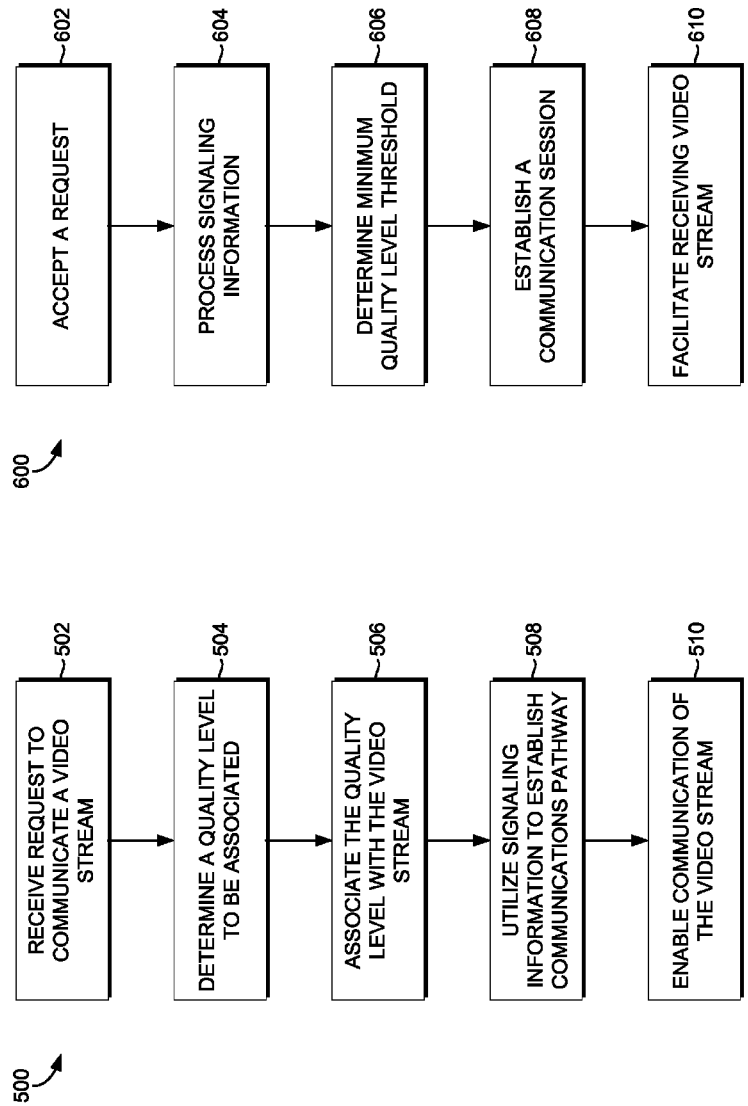

ENSURING QUALITY OF A VIDEO STREAM THROUGH A TELECOMMUNICATIONS NETWORK

CROSS-REFERENCE TO RELATED APPLICATIONS

This application is a continuation of U.S. patent application Ser. No. 12/171,451, filed Jul. 11, 2008, entitled "Ensuring Quality Of A Video Stream Through A Telecommunications Network," which is herein incorporated by reference.

BACKGROUND

Historically, media broadcasting companies receive video clips from reporters, journalists, and freelancers. Sometimes the video clips are received from a mobile communications device such as a camera-enabled mobile phone that utilizes a telecommunications network. But, the quality of the video clip communicated from a mobile phone through a telecommunications network is sometimes of poor quality because the telecommunications network operates on a best-efforts basis and does not provide a minimum quality level. One of the problems associated with receiving video clips from a mobile phone is that traditionally, the video clip is not communicated while the video clip is being captured. Instead, the video clip is captured by the mobile phone and then later communicated.

Users that capture video clips may desire to communicate those clips at a quality level at or above a minimum quality level to ensure the video clip is received at a certain quality by the media broadcasting company. Users may also desire the ability to communicate video streams contemporaneously to capturing the video. This may facilitate real-time or near real-time video streams of events and scenes that would otherwise not be provided to the media broadcasting company in a timely manner.

SUMMARY

This summary is provided to introduce a selection of concepts in a simplified form that are further described below in the detailed-description section. The invention is defined by the claims below. But in brief, one embodiment of the invention provides a method of ensuring that a video stream communicated from a mobile device is subject to a minimum quality level.

In a first aspect, a set of computer useable instructions provide a method of ensuring that a video stream communicated from a mobile device is communicated subject to a minimum quality level. The method includes receiving a request from the mobile device to communicate the video stream to a target device at the minimum quality level. A determination is made as to whether the mobile device is authorized to communicate the video stream at the requested minimum quality level by processing signaling information that is communicated from the mobile device to a policy server. When a determination is made that the mobile device is authorized to communicate the video stream at the requested minimum quality level, then resources are reserved to facilitate communication of the video stream at the minimum quality level. A communications session is established between the mobile device and the target device, where the communications session is associated with the resources that are reserved to facilitate communication of the video stream at the minimum quality level.

In a second aspect, a set of computer useable instructions provide a method of ensuring that a video stream communicated from a mobile device is communicated subject to a minimum quality level. The method includes determining whether the mobile device is authorized to communicate the video stream at the requested minimum quality level by processing signaling information that is communicated from the mobile device to a policy server. When a determination is made that the mobile device is authorized to communicate the video stream at the requested minimum quality level, then resources are reserved to facilitate communication of the video stream at the minimum quality level. A communications session is established between the mobile device and the target device, where the communications session is associated with the resources that are reserved to facilitate communication of the video stream at the minimum quality level.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 depicts a method for ensuring that a video stream communicated from a mobile device is communicated subject to a minimum quality level in accordance with an embodiment of the present invention;

FIG. 6 depicts a second method for ensuring that a video stream communicated from a mobile device is communicated subject to a minimum quality level in accordance with an embodiment of the present invention.

DETAILED DESCRIPTION

Figure 1:
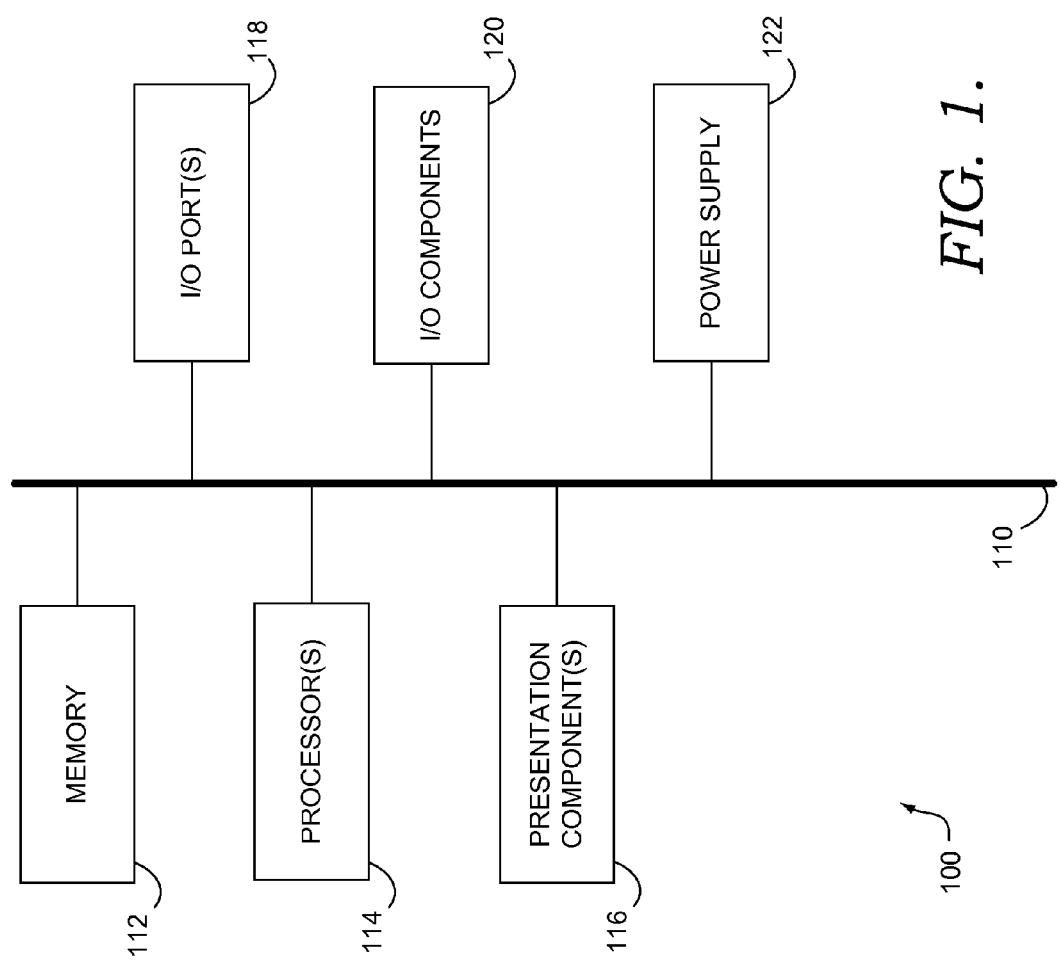
FIG. 1 depicts an exemplary computing device for implementing embodiments of the present invention in accordance with an embodiment of the present invention.

Embodiments of the present invention provide computer-readable media and methods for communicating a video stream from a mobile device subject to a minimum quality level.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| GSM | Global System for Mobile Communications |
| GPRS | General Packet Radio Service |
| iDEN | Integrated Digital Enhanced Network |
| IETF | Internet Engineering Task Force |
| IMS | IP Multimedia Subsystem |
| PCS | Personal Communications Service |
| SCTP | Stream Control Transmission Protocol |
| SIP | Session Initiation Protocol |
| TCP | Transmission Control Protocol |
| TDMA | Time Division Multiple Access |
| UDP | User Datagram Protocol |
| UMTS | Universal Mobile Telecommunications System |
| 3GPP | $3^{rd}$ Generation Partnership Project |

Further, various technical terms are used throughout this description. An illustrative resource that fleshes out various aspects of these terms can be found in *Newton's Telecom Dictionary* by H. Newton, $24^{th}$ Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Illustrative aspects of the invention will be described in greater detail below. Listing some aspects should not be construed as an indication that other aspects do not exist. But a select listing is provided for illustrative purposes.

Referring to the drawings in general, and initially to FIG. 1 in particular, an exemplary computing device for implementing embodiments of the present invention is shown and designated generally by numeral 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "mobile communications device," "hand-held device," etc., as all are contemplated within the scope of FIG. 1 and reference to "computer" or "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
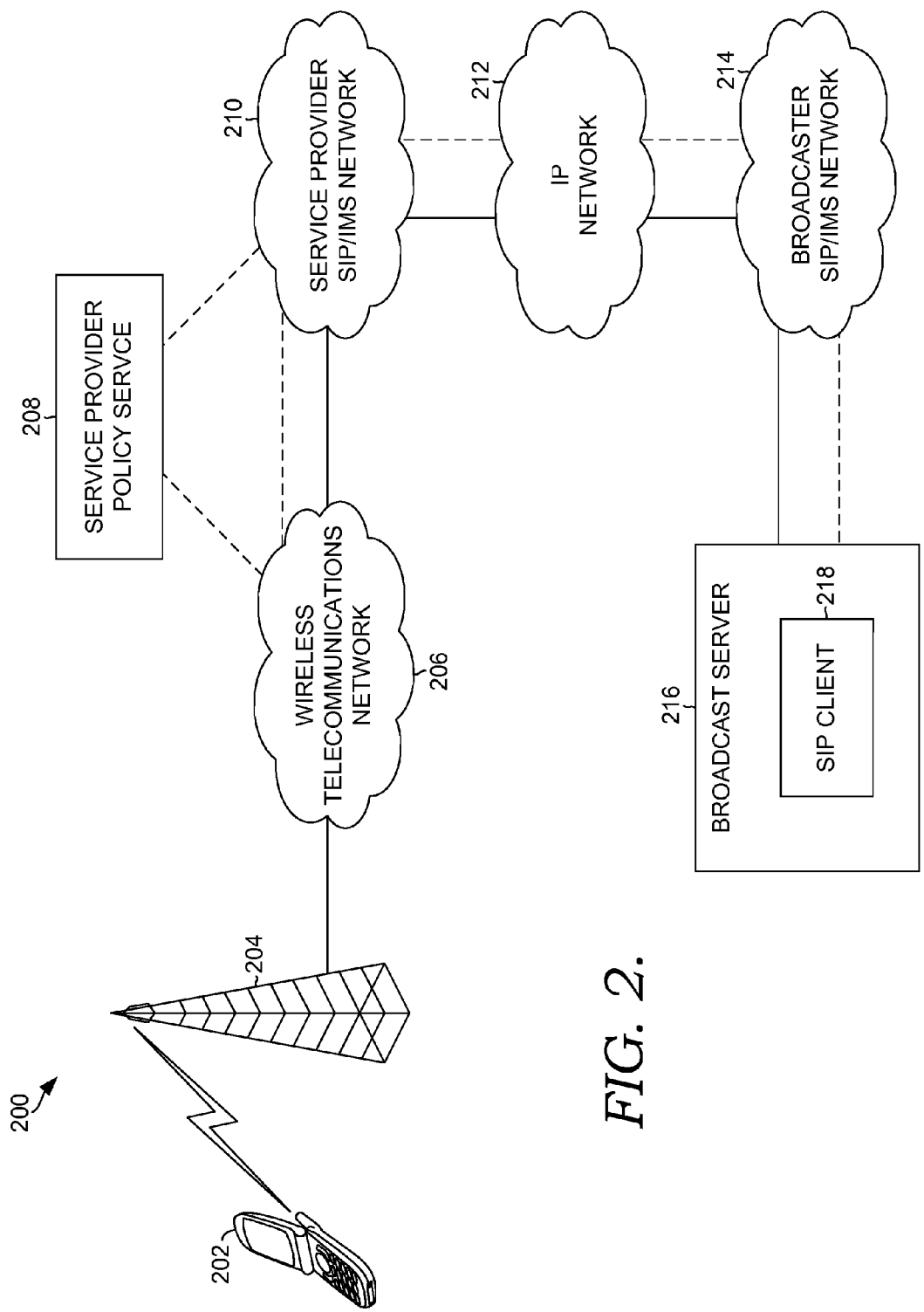
FIG. 2 depicts an illustrative system for communicating a video stream at a minimum quality level in accordance with an embodiment of the present invention.

FIG. 2 depicts an illustrative system for communicating a video stream at a minimum quality level and is referenced generally by the numeral 200. The solid lines connecting the various components and elements of system 200 represent an illustrative path by which a video stream may be communicated in an exemplary embodiment. The dashed lines connecting the various components and elements of system 200 represent an illustrative path by which signaling information may be communicated in an exemplary embodiment. The illustrative depiction of the solid and dashed lines are not limiting as to the scope of the various embodiments; instead, the lines merely aid in the discussion of system 200.

A mobile communications device is depicted by numeral 202. Mobile communication device 202 is capable of capturing and communicating video images and audible sounds, collectively referred to as video. Mobile communication device 202 includes a component that is capable of capturing a scene as a video image that can contemporaneously or subsequently be communicated through a wireless telecommunications network. The video image-capturing component of a mobile communications device may be directly coupled or removeably coupled depending on the device design. For example, a remote camera may be coupled to the wireless communication device to provide flexibility and greater control to capture a scene. Additionally, the camera may be incorporated into the wireless communications device to provide a compact or combined device. Similar to the video image component, the audible capture component includes built-in microphones, wireless microphones, wired microphones, and other audio collection components. Mobile communications device 202 captures both audio and visual information that is collectively referred to as video. In an exemplary embodiment, audio information is not required to be included with video information in order for there to be video.

Mobile communications device 202 communicates by way of wireless transceiver, depicted by numeral 204. A wireless transceiver serves as a transceiver for wireless communications between the mobile communications device 202 and a wireless telecommunications network. Examples of wireless transceivers include, but are not limited to, a base station transceiver. A base station transceiver is functionally equivalent for the purposes of the present application to a Node B.

A wireless telecommunications network is depicted by numeral 206. A wireless telecommunications network refers to any type of telecommunications network that is wireless. Examples of a wireless telecommunications network technologies that are compatible with wireless telecommunications network 206 include, but are is not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications System (UMTS), Integrated Digital Enhanced Network (iDEN), Worldwide Interoperability for Microwave Access (WiMAX), and Personal Communications Service (PCS).

An exemplary embodiment includes a wireless telecommunications network that operates in about the frequency bands of GSM. GSM networks generally operate in four different frequency ranges. The first two ranges operate in the 900 MHz or 1800 MHz bands. Some countries in the Americas (including Canada and the United States) use the 850 MHz and 1900 MHz bands because the 900 and 1800 MHz frequency bands were already allocated. In the 900 MHz band, the uplink frequency band is 890-915 MHz, and the downlink frequency band is 935-960 MHz. The third and fourth ranges include the 400 and 450 MHz frequency bands.

Another exemplary embodiment includes a wireless telecommunications network that operates in about the frequency bands of UMTS. The specific frequency bands originally defined by the UMTS standard include 1885-2025 MHz for the mobile-to-base (uplink) and 2110-2200 MHz for the base-to-mobile (downlink). In the United States, 1710-1755 MHz and 2110-2155 MHz are utilized. Additionally, in some countries UMTS operators use the 850 MHz and/or 1900 MHz bands.

Yet another exemplary embodiment includes a wireless telecommunications network that operates in about the frequency bands of PCS. PCS utilizes the 1900-MHz radio band, which includes the frequency band of 1850-1990 MHz, for digital mobile phone services.

In an exemplary embodiment, the frequency bands utilized do not include the about 2.4 GHz and 5.8 GHz bands. These bands are utilized by Wi-Fi technology in connection with wireless home computing networks.

Service provider policy server is referenced generally by numeral 208. A service provider policy server is a computing device accessible by a wireless telecommunications network operated by a service provider. The service provider policy server 208 includes a data store that indicates the policies, permissions, and rules associated with a user or device associated with the wireless telecommunications network 206. In an exemplary embodiment, the service provider policy server 208 includes an indication of the minimum quality level that a particular device or user is authorized to communicate a video stream. For example, the service provider policy server 208 includes a registry of the service provider's users and the users' account details that indicate what level of quality is allowed for the user to communicate a video stream. The service provider policy server 208 monitors requests to stream video content and enables the adjustment of the level of quality that is provided to the requesting user or device based on the user or device's service plan.

In an exemplary embodiment, a user of the service provider's wireless telecommunications network 206 subscribes to a level of service that allows for a quality of service level that has priority over the service provided to other users of the network that subscribe to a lesser minimum quality level. Therefore, the user that subscribes to a higher quality will receive priority in the communication of their video stream. The greater priority will allow the communicated video stream to pass through the network at times when the network is at or near capacity, while those users that are at a lower priority will have their communications interrupted sooner than the user with the higher priority.

In an exemplary embodiment, a user of the service provider's wireless telecommunications network 206 subscribes to a level of service that allows for a minimum level of quality based on a reserved portion of bandwidth. Reservation of bandwidth may include reserving a range in frequencies or a portion of data transfer capacity to ensure a network throughput of streaming video content. So, for example, a portion of capacity of the wireless sections of the communication path may be reserved as well as a portion of capacity of the non-wireless sections of the communications path.

The minimum quality level is accomplished by a Quality of Service (QoS), which refers to resource reservation control mechanisms rather than the achieved service quality. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications, since these often require fixed bit rate and are delay sensitive, and in networks where the capacity is a limited resource. High QoS does always represent a high level of performance or achieved service quality, for example high bit rate, low latency, and low bit error probability.

Referring back to the service provider policy server 208, the service provider policy server 208 receives a request from a user to communicate a video stream. The service provider policy server 208 identifies what minimum level of quality to which the requesting user is entitled. The request to communicate a video stream is communicated as signaling information. In an exemplary embodiment, signaling information is compatible with Session Initiation Protocol (SIP). Which, in an exemplary embodiment, is communicated over a SIP and IP Multimedia Subsystem (IMS) enabled network.

SIP is a signaling protocol. The SIP protocol is situated at the session layer in the Open Systems Interconnections model and at the application layer in the TCP/IP model. SIP is designed to be independent of the underlying transport layer; it can run on Transmission Control Protocol (TCP), User Datagram Protocol (UDP), or Stream Control Transmission Protocol (SCTP).

IMS is an architectural framework that allows for communication of Internet Protocol (IP) multimedia to and from fixed and mobile device users operating across both wired and wireless networks. IMS allows for the integration of fixed and mobile devices with IP networks, such as the Internet. In order to accomplish this integration, IMS utilizes protocols that are compatible with the Internet, such as SIP. A service provider SIP/IMS network is referenced generally by numeral 210. A service provider SIP/IMS network is a SIP and IMS enabled network that supports SIP signaling and the communication of multimedia. Service provider SIP/IMS network 210 facilitates the communication of the request to communicate a video stream from mobile device 202 to an eventual end-point, a broadcast server 216.

FIG. 2 is not meant to imply that the wireless transceiver 204, the service provider policy server 208, and the service provider SIP/IMS network 210 are distinctly separate from the wireless telecommunications network 206. Instead, the wireless telecommunications network 206 may include any combination of the wireless transceiver 204, the service provider policy server 208, and the service provider SIP/IMS network 210. Additionally, the lines that depict a connection among the wireless transceiver 204, the service provider policy server 208, wireless telecommunications network 206, and the service provider SIP/IMS network 210 are not intended to imply an explicit connection, but instead are merely to facilitate understanding of an exemplary embodiment of the present invention.

For example, the service provider SIP/IMS network 210 is a SIP and IMS enabled subset of the wireless telecommunications network 206. Additionally, the wireless telecommunications network 206 includes the service provider policy server 208.

An IP network is depicted generally by numeral 212. The IP network 212 is a computing network that utilizes IP protocol as a network layer protocol. The network 212 may include, without limitation, one or more local networks, (LANs) and/or wide area networks (WANs). Such networking environments are commonplace in offices, enterprise-wide computer networks, intranets, and the internet. Accordingly, the network 212 is not further described herein.

A broadcaster SIP/IMS network is generally depicted by numeral 214. The broadcaster SIP/IMS network 214 is a SIP and IMS enabled network that is in communication with the IP network 212. In an exemplary embodiment, a broadcaster SIP/IMS network is a network utilized by a video broadcaster to receive video streams from mobile users. A video broadcaster includes television stations, news agencies, online content providers, and other entities that provide video content. The broadcast SIP/IMS network 214 allows a broadcaster to receive video content at a minimum quality level. In an exemplary embodiment, the broadcast SIP/IMS network 214 is functionally comparable to the service provider SIP/IMS network 210 previously discussed.

A broadcast server is referenced generally by numeral 216. A broadcast server is a computing device utilized by a broadcaster to receive video content. For example, a broadcast server may be a server that receives and stores video content received from a mobile communications device by way of a wireless telecommunications network that is SIP and IMS enabled. In this example, the broadcast server 216 is SIP and IMS enabled to utilize signaling information included with or received in advance of the received video content. A broadcast server is not limited to a single server, but instead represents a plurality of broadcast servers that are coupled, directly or indirectly by a network, such as the broadcaster SIP/IMS network 214.

A SIP client is referenced generally by the numeral 218. A SIP client (also referred to as a SIP stack by those with skill in the art) facilitates communication of signaling information that utilizes a SIP protocol. In an exemplary embodiment, the SIP client provides an interface that allows the broadcast server to receive the video stream (content) at the minimum quality level. For example, the SIP client 218 provides for the broadcast server 216 to receive a video stream from the mobile communications device 202 by way of the wireless telecommunications network 206, service provider SIP/IMS network 210, IP network 212, and the broadcaster SIP/IMS network 214.

Mobile communication device 202 sends a request to an endpoint, broadcast server 216, to communicate a video stream at a desired minimum quality level. The request is communicated wirelessly to the wireless transceiver 204 that communicates the request by way of the wireless telecommunications network 206 to the service provider policy server 208. The service provider policy server 208 identifies the mobile communications device 202 and determines if the mobile communications device 202 is authorized to communicate a video stream at the requested minimum quality level. When it is determined that the minimum quality level is available, resources are reserved in the wireless telecommunications network 206, including wireless resources to facilitate communication between the mobile communications device 202 and the wireless transceiver 204. The request is communicated to the Sip client 218 of the broadcast server 216 by way of the service provider SIP/IMS network 210, the IP network 212, and the broadcaster SIP/IMS network 214. A minimum quality level communications path is established between the wireless transceiver 204 and the broadcast server 216 to facilitate communication of the video stream.

Examples of minimum quality level communication paths include those paths created utilizing a Resource Reservation Protocol (RSVP). RSVP is described in more detail in a technical specification provided by IETF and titled RFC 2205 (available at, http://tools.ietf.org/html/rfc2205). RSVP is a transport layer protocol that reserves resources across a network. Additionally, a minimum quality level path can be created utilizing a Differentiated Services (DiffServ) model. In the DiffServ model, packets are marked according to the type of service they need. In response to these markings, routers and switches use various queuing strategies to tailor performance to requirements.

A minimum quality level communications path is established over the wireless connection between the mobile communications device 202 and the wireless transceiver 204, in conjunction with the minimum quality level communications path from the wireless transceiver 204 to the broadcast server 216, it also provides a communications path that streaming video is communicated at a minimum quality level.

The lines of FIG. 2 are not intended to restrict or imply a restriction as to the connections and relationships that exist among the various elements/components depicted at FIG. 2. Instead, the various elements/components, of which not all are necessary, may be coupled in ways not depicted. Such as, the service provider SIP/IMS network 210 and the wireless telecommunications network 204 are a single network and not separate networks as depicted for discussion purposes.

Figure 3:
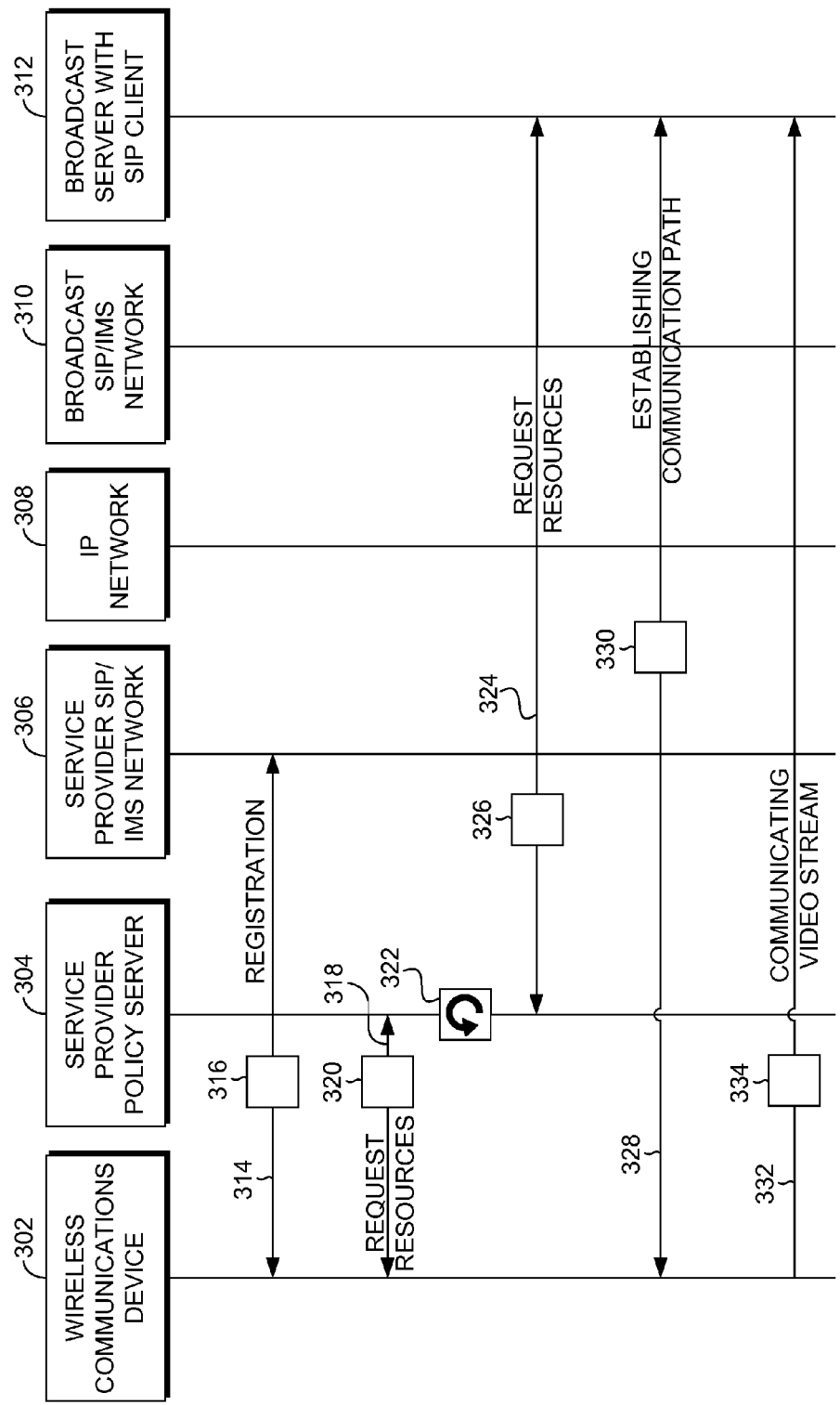
FIG. 3 depicts a communication flow diagram for the communication of a video stream from a mobile communications device at a minimum quality level in accordance with an embodiment of the present invention.

Turning now to FIG. 3, which depicts a communications flow diagram for the communication OF a video stream from a mobile communications device at a minimum quality level, generally referenced by numeral 300. The communications flow diagram 300 includes a wireless communications device generally depicted by numeral 302, a service provider policy server generally depicted by numeral 304, a service provider SIP/IMS network generally depicted by numeral 306, an IP network generally depicted by numeral 308, a broadcaster SIP/IMS network generally depicted by numeral 310, and a broadcast server with a SIP client generally depicted by numeral 312. In general, the elements/components of FIG. 3 relate to the disclosure provided in reference to the same named elements/components of FIG. 2. Therefore, as way of an example, the wireless communications device 302 is comparable to the wireless communications device 202 of FIG. 2 and should be viewed in light of the previous discussion concerning wireless communications device 202.

Wireless communications device 302 communicates, generally depicted by numeral 314, a registration, generally depicted by numeral 316, to the service provider SIP/IMS network 306. The registration 316 registers the mobile communications device 302 with a service provider. In an exemplary embodiment, the registration of the mobile communications device facilitates updating a data store of the service provider policy server to indicate the policies and rules to which the mobile communications device is authorized. This may be accomplished by the service provider updating the data store or the wireless communications device 302 updating the data store. Communication 314 is a two-way communication that includes providing confirmation of registration to the mobile communications device 302. Service provider SIP/IMS network 306 includes the functionality previously discussed with respect to the wireless telecommunications network 206 and service provider SIP/IMS network 210 as a single network.

The wireless communications device 302 communicates, generally depicted by numeral 318, a request for resource, generally depicted by numeral 320, which is received by the service provider policy server 304. The request for resources 320 indicates the minimum quality level at which the mobile communications device requests to communicate a video stream. The service provider policy server 304 determines, as generally depicted by numeral 322, the authorized minimum level of quality associated with the mobile communications device 302. When the mobile communications device 302 is authorized for the minimum quality level requested, a request for resource, generally depicted by numeral 326, is communicated to the broadcast server with a SIP client 312, as generally depicted by numeral 324. The requests 324 and 326 are communications utilizing signaling information. In an exemplary embodiment, the requests 324 and 326 are signaling communications utilizing a protocol compatible with SIP.

A communications path, as depicted generally by numeral 330, is established, as depicted generally, by numeral 328. The communication path 330 provides a communication path between the mobile communications device 302 and the broadcast server with SIP client 312, which facilitates the communication of a video stream at a minimum quality level. Communication path 330 is established, in this exemplary embodiment, utilizing the broadcaster SIP/IMS network 310, the IP network 308, and the service provider SIP/IMS network 306 to provide a communications path at a minimum quality level.

The mobile communication device 302 communicates, as generally depicted by numeral 3332, a video stream, as generally depicted by numeral 334, to the broadcast server with a SIP client 312. The video stream 334 is captured by the mobile communication device 302 or a video capture device associated with the mobile communications device, contemporaneously as the mobile communications device 302 communicates 3332 the video stream 334 at a minimum quality as originally indicated in the request 320 and 326.

Figure 4:
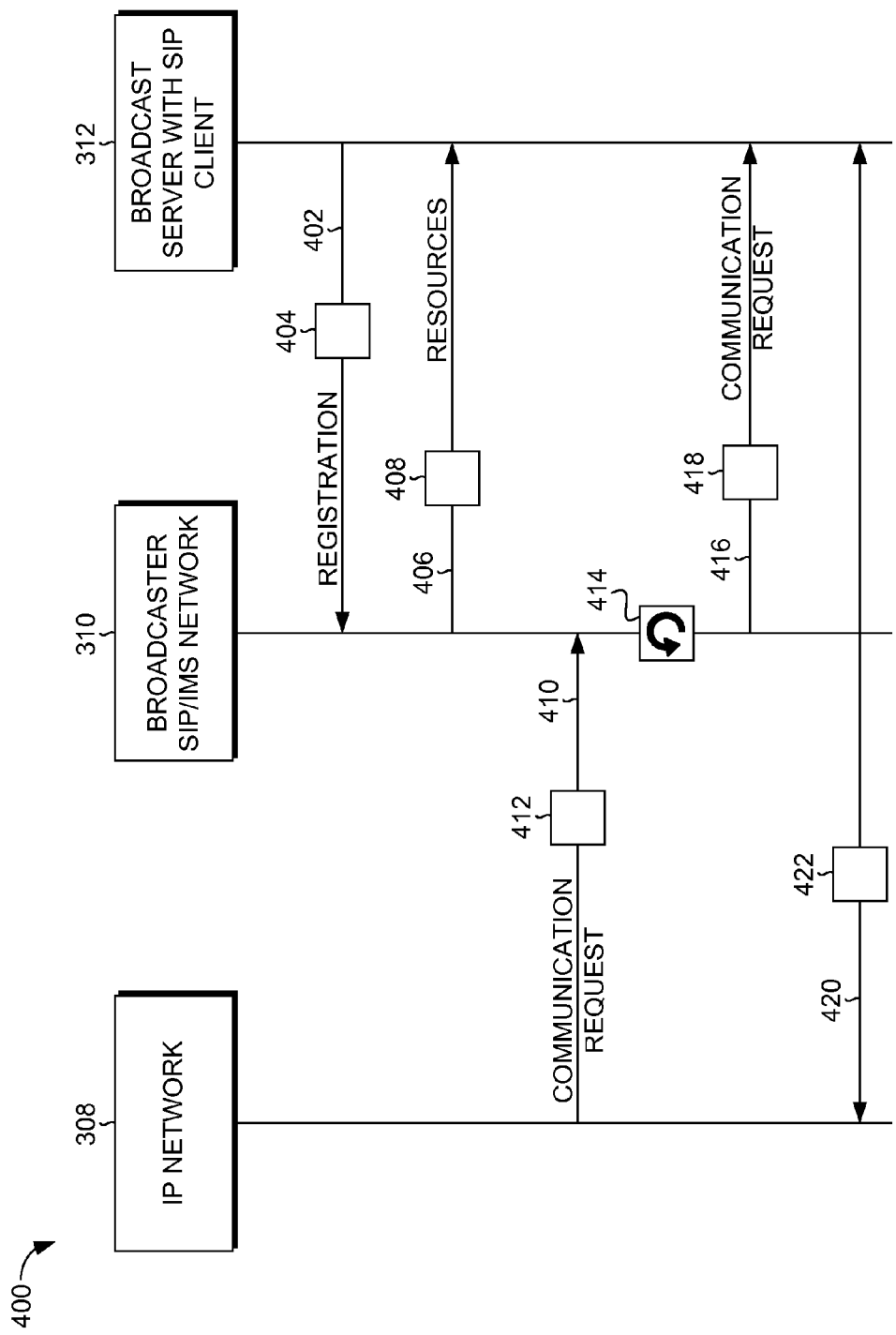
FIG. 4 depicts a communications flow diagram for the communication of a video stream to a broadcast server device at a minimum quality level in accordance with an embodiment of the present invention.

Turning now to FIG. 4, which depicts a communications flow diagram for the registration and communication of a video stream to a broadcast server device at a minimum quality level, generally referenced by numeral 400. The communications flow diagram 400 includes the IP network 308, the broadcaster SIP/IMS network 310, and the broadcast server with a SIP client 312 as previously discussed with reference to FIG. 3. The communications flow diagram 400 depicts, among other things, the communication flow from the broadcast server with a SIP client 312 perspective.

The broadcast server with a SIP client 312 communicates, as generally depicted by numeral 402, a registration, as generally depicted by numeral 404, to the broadcaster SIP/IMS network 310. Registration 404 registers the broadcast server with a SIP client 312 on the broadcaster SIP/IMS network 310. Registration 404 includes signaling information to facilitate the registration. In an exemplary embodiment, a broadcast server that has an associated SIP client registers with an IMS and SIP enabled network utilizing SIP protocol. The registration allows communications to be directed to the SIP client of the broadcast server to facilitate the development of a communications pathway that can support a minimum quality level.

The broadcaster SIP/IMS network 310 communicates, as generally depicted by numeral 406, an allocation of resources, as generally depicted by numeral 408, to the broadcast server with a SIP client 312. The allocation of resources 408 includes providing a communications pathway through the broadcaster SIP/IMS network 310, through which requests to communicate data are passed. In additional embodiments, an allocation of resources includes assigning identifiers that allow for a broadcast server with a SIP client to be located and/or identified.

A communication, as generally depicted by numeral 410, of a request, as generally depicted by numeral 412, is received by the broadcaster SIP/IMS network 310. The request 412 is a request to communicate information with the broadcast server with a SIP client 312 at a minimum quality level. In an exemplary embodiment, request 412 is comparable to request 326 as previously discussed with reference to FIG. 3. The request 412 is a request from a mobile communications device to communicate a video stream at a minimum quality level. The request 412 is directed to the broadcast server with a SIP client 312. Generally, because the broadcast server with a SIP client 312 previously registered by way of communication 402 and was allocated resources 408, the request 412 is directed to the broadcast server with a SIP client 312. The broadcaster SIP/IMS network 310 determines, as generally depicted by numeral 414, that the request 412 is directed to the broadcast server with a SIP client 312. As a result, the request, that is now generally depicted by numeral 418, is communicated, as generally depicted by numeral 416, to the broadcast server with a SIP client 312.

A communications path, generally depicted by numeral 422, is communicated, as generally depicted by numeral 420, between the broadcast server with a SIP client 312 and the IP network 308. The communication path 422 is comparable to the communications path 330 discussed previously with reference to FIG. 3.

Signaling information included with the request 412 is utilized to establish the communications pathway 422. In an exemplary embodiment, the signaling information identifies the requester and the target device as well as the desired minimum level of quality desired to communicate a video stream. In an exemplary embodiment, an IMS and SIP enabled network associated with a mobile communications device and an IMS and SIP enabled network associated with a broadcast server interpret SIP compatible signals communicated by the mobile communications device and directed to the broadcast server. Each of the IMS/SIP enabled networks communicate with one another to provide a communications pathway that facilitates the communication of the video stream at a level of quality that is at least the minimum level of quality at which the mobile communications device (or the user of the mobile communications device) is authorized to communicate.

Turning now to FIG. 5, an illustrative method according to an embodiment for ensuring that a video stream communicated from a mobile device is communicated subject to a minimum quality level is provided and referenced generally by the numeral 500. At a step 502, the wireless telecommunications network 206 receives a request from a mobile device, such as the mobile communications device 202. The request is to communicate a video stream at a minimum quality level to a target device, such as the broadcast server 216. Included with the request is the minimum quality level at which the video stream is requested to be communicated. In this exemplary embodiment, the video stream includes both audio and video information that is being contemporaneously received by the mobile communications device 202 and communicated from the mobile communications device 202. For example, mobile communications device 202 includes a video-camera-type device that captures video and at least temporarily stores the video as digital information while communicating the request to establish a communication pathway of a minimum quality level to the broadcast server 216.

In an exemplary embodiment, the request is an invitation supplied by the mobile communications device for the broadcaster server 216 to establish a communications pathway that will be utilized to communicate the video stream at a minimum quality level. In particular, the invitation is a SIP invite or other SIP request.

At a step 504, the service provider policy server 208 determines a quality level to be associated with a communication of the video stream. The level of quality is partly determined by processing information that is communicated from the mobile communications device 202 to the wireless telecommunications network 206 and directed to the service provider policy server 208. The policy server 208 is able to map or associate the mobile communication device 202 with a designated quality level. For example, a data store of the service provider policy server 208 will indicate the authorized minimum quality level at which the mobile communications device 202 is allowed to communicate.

At a step 506, the wireless telecommunications network 206 associates the designated quality level authorized to the mobile communications device 202 with the video stream. The video stream will therefore be communicated in a manner consistent with the designated quality level. For example, a minimum quality level may require certain resources to be dedicated in the wireless network in order to have the appropriate capacity to communicate the video stream without introducing latency or jitters into the video stream. When it is determined that the resources of the wireless network must be dedicated in order to attain the designated quality level, those resources will be dedicated to the communication of the video stream in order to achieve the minimum quality level.

At a step 508, the wireless telecommunications network 206 utilizes the signaling information communicated from the mobile communications device 202 to establish a communications pathway between the mobile communications device 202 and the broadcast server 216. In an exemplary embodiment, the broadcast server 216 includes the SIP client 218 that allows for the communication of the video stream at the minimum quality level. Without the SIP client 218, the broadcast server could not establish a communication pathway that is at a minimum quality level based on the signaling information communicated from the mobile communications device 202. This is in part because the broadcast server 216 could not register with a SIP and IMS enabled network.

At a step 510, the wireless telecommunications network 206 enables the communication of the video data stream through the communications pathway. The communication of the video stream through the communications pathway is consistent with the designated quality level. Therefore, in an exemplary embodiment, the wireless portion of the communication pathway facilitates communication of the video stream at the minimum quality level as well as the nonwireless portions of the communications pathway facilitate communication of the video stream at the minimum quality level.

Turning now to FIG. 6, an illustrative method according to an embodiment for ensuring that a video stream communicated from a mobile device is communicated subject to a minimum quality level is provided and referenced generally by the numeral 600. At a step 602, the service provider policy server 208 accepts a request from the mobile communications device 202. The request is communicated through a wireless telecommunications network 206. In an exemplary embodiment, the request includes signaling information to establish a communication pathway.

At a step 604, the service provider policy server 208 processes the signaling information associated with the request to identify a minimum quality level threshold that the video stream is to be communicated. For example, the signaling information may include a unique identifier of the wireless communications device 202 that communicated the request. The unique identifier is referenced in a data store of the service provider policy server 208 to determine at what quality level the mobile communications device 202 is authorized to communicate the video stream.

At a step 606, the service provider policy server 208 determines that the minimum quality level threshold is available to communicate the video stream from the mobile communications device 202. The determination in an exemplary embodiment includes verifying that the requested minimum quality level is at least the minimum quality level threshold the mobile communications device 202 is authorized in which to communicate a video stream. In an alternative exemplary embodiment, the determination includes verifying that the resources exist on the wireless telecommunications network 206, the service provider SIP/IMS network 210, the IP network 212, and the broadcaster SIP/IMS network 214 to communicate the video stream at the requested minimum quality level threshold. A minimum quality level threshold is a minimum quality standard that is acceptable for the communication of a video stream.

At a step 608, the service provider policy server 208 establishes a communications session (communications pathway). The communications session is utilized to communicate a video stream from the mobile communications device 202 to the broadcast server 216. In an exemplary embodiment, the communication session is established utilizing signaling information communicated from the mobile communications device. In an exemplary embodiment, the signaling information is SIP compatible.

At a step 610, the service provider policy server 208 facilitates receiving the video stream. The facilitation of receiving the video stream includes ensuring that a minimum quality level threshold is available for the communication of the video stream. In an exemplary embodiment, the facilitating of the reception of the video stream includes utilizing the signaling information to direct the video stream to the requested end point, where the end point receives the video stream. Additionally, in an exemplary embodiment, the signaling information communicated by the mobile communications device 202 is utilized by the service provider policy server 208 to facilitate the reception of the video stream, where the video stream is communicated at a quality level consistent with the quality level threshold.

Figure 7:
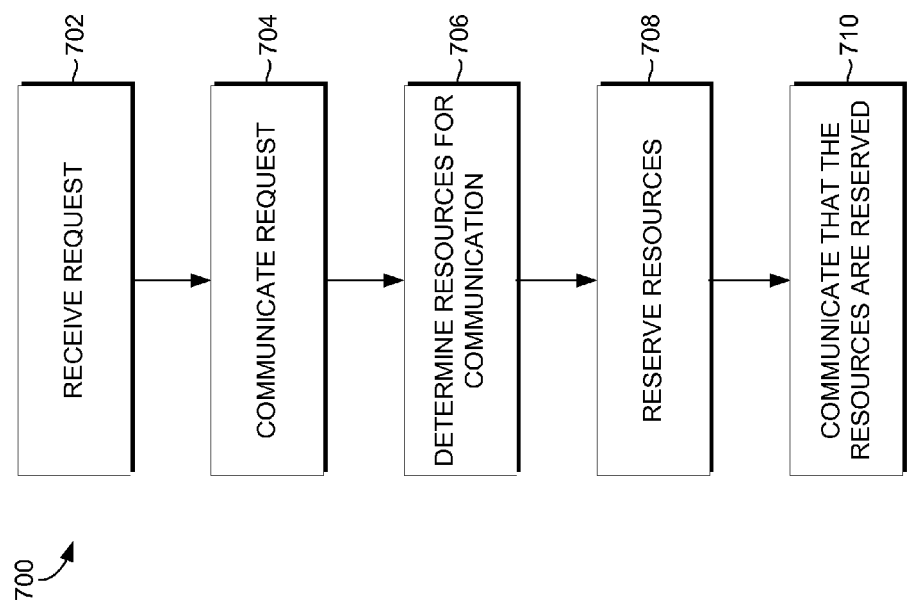
FIG. 7 depicts a third method for ensuring that a video stream communicated from a mobile device is communicated subject to a minimum quality level in accordance with an embodiment of the present invention.

Turning to FIG. 7, an illustrative method according to an embodiment for ensuring that a video stream communicated from a mobile device is communicated subject to a minimum quality level is provided and referenced generally by the numeral 700. At a step 702, the service provider policy server 208 receives a request by way of signaling information to communicate a video stream. The request identifies a minimum quality level in which the video stream should be communicated. The request additionally indicates the target device that is intended to receive the video stream. In an exemplary embodiment, the signaling information is compatible with SIP protocol.

At a step 704, the service provider policy server 208 communicates the request to the target device. In an exemplary embodiment, the target device is the broadcast server 216 that includes the SIP client 218. Therefore, the broadcast server 216 with the SIP client 218 is able to receive and utilize the signaling information communicated from the service provider policy server 208.

At a step 706, the service provider policy server 208 determines the resources necessary to communicate the video stream from the mobile device at the minimum quality level. For example, the amount of bandwidth required to obtain the requested minimum quality level may be evaluated or the priority of other requests relative to the present request may be compared to determine what resources are required and if those resources are available.

At a step 708, the service provider policy server 208 reserves the resources that are determined in order to communicate the video stream at least at the minimum quality level requested. In particular, the resources required to communicate the video stream over the wireless communication network are reserved. The reservation of resource may include identifying bandwidth or providing a priority to data communicated by the mobile communication device 202.

At a step 710, the service provider policy server 208 communicates with the mobile communications device 202 that the resources that were determined to be required to communicate the video stream at the minimum quality level have been reserved. The communication of the reservation is done utilizing signaling information. In an exemplary embodiment, the signaling information is compatible with SIP protocol and communicated though an IMS enabled network.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon for performing a method of ensuring that a video stream communicated from a mobile device is communicated subject to a minimum quality level, the method comprising:
   receiving a request from the mobile device to communicate the video stream to a target device at the minimum quality level;
   determining whether the mobile device is authorized to communicate the video stream at the requested minimum quality level by processing signaling information communicated from the mobile device to a policy server;
   when a determination is made that the mobile device is authorized to communicate the video stream at the requested minimum quality level, then reserving resources to facilitate communication of the video stream at the minimum quality level; and
   establishing a communications session between the mobile device and the target device, wherein the communications session is associated with the resources reserved to facilitate communication of the video stream at the minimum quality level.

2. The media of claim 1 wherein the request includes an invitation from the mobile device.

3. The media of claim 2, wherein the invitation is compatible with a version of Session Initiation Protocol (SIP).

4. The media of claim 3, wherein the invitation is a SIP invite message.

5. The media of claim 1, wherein the request is received through a base station that forms part of a wireless telecommunication network.

6. The media of claim 5, wherein the wireless communications network operates at a frequency other than about 2.4 GHz and about 5.8 GHz.

7. The media of claim 5, wherein the wireless communications network utilizes a protocol that includes a selection from the following:
   Code Division Multiple Access (CDMA);
   Time Division Multiple Access (TDMA);
   Global System for Mobile Communications (GSM);
   General Packet Radio Service (GPRS);
   Integrated Digital Enhanced Network (iDEN).

8. The media of claim 1, wherein the minimum quality level indicates at least one of the following:
   a minimum bandwidth that is to be allocated to a communication of at least a portion of the video stream; or
   a priority level to be associated with data that makes up the video stream.

9. The media of claim 1, wherein facilitating communication of the video stream includes enabling communication of the video stream through at least a portion of the Internet to a receiving device that includes a Session Initiation Protocol (SIP) stack that helps facilitate reception of the video stream.

10. The media of claim 9, wherein the receiving device utilizes the SIP stack to register in an Internet protocol Multimedia Subsystem (IMS) environment.

11. The media of claim 1, wherein the signaling information is compatible with a version of Session Initiation Protocol (SIP).

12. The media of claim 1, wherein the determination that the mobile device is authorized to communicate the video stream at the requested minimum quality level is made by way of referencing a data store that associates a quality of service level with an identifier that identifies the mobile device.

13. A method of ensuring that a video stream communicated from a mobile device is communicated subject to a minimum quality level, the method comprising:
   determining whether the mobile device is authorized to communicate the video stream at the requested minimum quality level by processing signaling information communicated from the mobile device to a policy server;
   when a determination is made that the mobile device is authorized to communicate the video stream at the requested minimum quality level, then reserving resources to facilitate communication of the video stream at the minimum quality level; and
   establishing a communications session between the mobile device and the target device, wherein the communications session is associated with the resources reserved to facilitate communication of the video stream at the minimum quality level.

14. The method of claim 13, wherein the request includes a Session Initiation Protocol (SIP) invite message from the mobile device.

15. The method of claim 13, wherein the minimum quality level indicates at least one of the following:
- a minimum bandwidth that is to be allocated to a communication of at least a portion of the video stream; or
- a priority level to be associated with data that makes up the video stream.

16. The method of claim 13, wherein facilitating communication of the video stream includes enabling communication of the video stream through at least a portion of the Internet to a receiving device that includes a Session Initiation Protocol (SIP) stack that helps facilitate reception of the video stream.

17. The media of claim 16, wherein the receiving device utilizes the SIP stack to register in an Internet Protocol Multimedia Subsystem (IMS) environment.

* * * * *